J. C. HORNUNG.
DIFFERENTIAL, PRESSURE, AND TEMPERATURE CONTROL VALVE SYSTEM.
APPLICATION FILED JULY 27, 1912.
1,100,077.
Patented June 16, 1914.
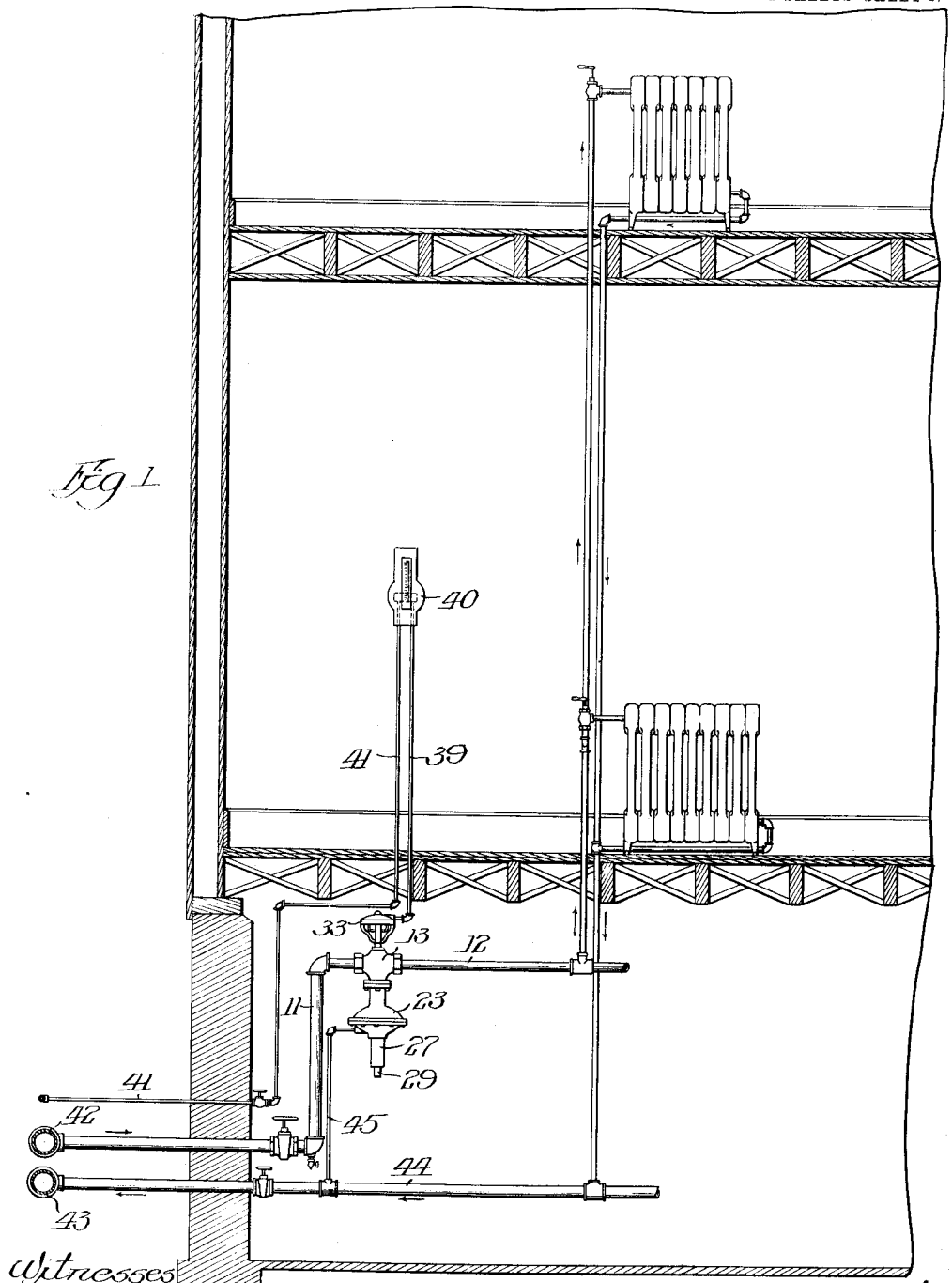

J. C. HORNUNG.
DIFFERENTIAL, PRESSURE, AND TEMPERATURE CONTROL VALVE SYSTEM.
APPLICATION FILED JULY 27, 1912.
1,100,077.
Patented June 16, 1914.
2 SHEETS—SHEET 2.
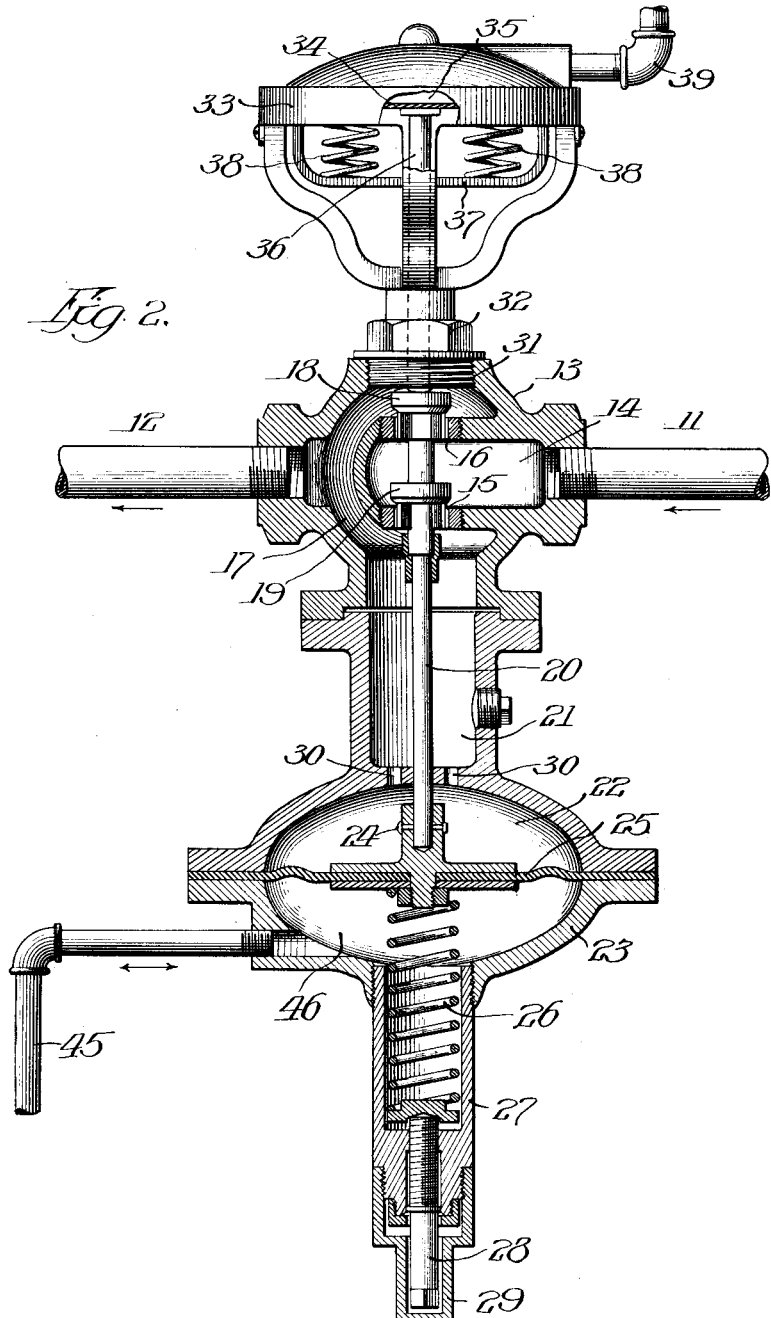

UNITED STATES PATENT OFFICE.

JOHN C. HORNUNG, OF CHICAGO, ILLINOIS.

DIFFERENTIAL, PRESSURE, AND TEMPERATURE CONTROL VALVE SYSTEM.

1,100,077.  Specification of Letters Patent.  Patented June 16, 1914.

Application filed July 27, 1912. Serial No. 711,905.

*To all whom it may concern:*

Be it known that I, JOHN C. HORNUNG, a citizen of the United States, residing at Chicago, in the county of Cook and State of Illinois, have invented certain new and useful Improvements in Differential, Pressure, and Temperature Control Valve Systems, of which the following is a specification.

My invention relates to central station heating and has particular reference to a system comprising a combination of valves and connections whereby to maintain within the house piping a predetermined differential head of pressure between the inlet to and the outlet from said piping irrespective of fluctuations of pressure in the supply and return mains, the maintenance of said predetermined differential being in turn controlled automatically by variations of temperature in the apartment so that in comparatively warm weather the differential head may be maintained lower than in extremely cold weather and vice versa, the upper limit of the differential being fixed by the adjustment of the device.

In central station heating the pressure within the mains varies greatly at the point of leaving the central station and the point of return thereto and consequently the pressure at an entrance to a house near the central station is much higher than at a distance therefrom while the pressure in the return main is much lower in the near house than it is at the more remote one. It may happen, for instance, that the entrance pressure from the supply main at the near house is 60 pounds while the pressure at the discharge therefrom to the return main at that point may be 10 pounds, a difference of 50 pounds; and near the end of the main the difference in pressure between the two may not exceed 3 or 4 pounds.

In order to insure the proper flow of the heating fluid through the house piping it is necessary that there shall be a differential pressure at the inlet to and the outlet from the house or head of pressure in the house piping which head will depend upon the height of the building, the length of the piping and the number of radiators which measure the friction within said house piping. Under ordinary circumstances a head of pressure within the house or a differential between the inlet and outlet of 2 pounds is sufficient and an increase of the head beyond this point is waste of the heating power while a decrease below this point will insufficiently heat the house. It is to maintain this differential pressure within the house piping constant under given weather conditions and unaffected by fluctuations in the supply and return mains at whatever distance from the central station that the present invention is designed.

In the accompanying drawings I have illustrated a preferred embodiment of the invention, from which taken in connection with the following detailed description based thereon the invention will be readily understood.

In these drawings, Figure 1 represents a vertical section through a portion of a house showing in a diagrammatic manner a house system embracing the invention, and Fig. 2 is an enlarged elevation partly in section of the form of differential temperature and pressure control valve preferred by me.

In the drawing the reference numeral 11 designates a pipe leading from the supply main, and 12 designates a pipe leading to the house heating system. The heating fluid passing from one of these pipes to the other traverses the valve casing 13 entering first the valve chamber 14 and thence by way of the twin ports 15 and 16 to the valve chamber 17 which latter is in communication with the pipe 12. The ports 15 and 16 are controlled respectively by the two members 19 and 18 of a twin valve mounted upon the stem 20 which depends from said valve through the cylinder 21 into the upper space 22 of a diaphragm casing 23 where said stem is attached by means of a pin 24 to the upper face of a diaphragm 25 while the lower face of said diaphragm bears upon a coil spring 26 disposed within the housing 27 and adjustable as to tension by means of the screw bolt 28 threaded within the lower portion of the housing 27 and capable of adjustment therein by means of its angular shank arranged to coöperate with a suitable tool, the screw being covered by a cap 29.

The operation of the pressure control valve thus far described is well known. The object of this valve is to maintain a constant head of pressure within the valve chamber 17 and the pipe 12, which pressure is less than that within the valve chamber 14 and the pipe 11. By reason of the fact that the valve stem is attached to the upper face of the diaphragm 25 and by reason of the further fact that the upper space 22 within the diaphragm casing is in communication by the ports 30, 30 and the interior of the cylinder 21 with the valve chamber 17, while the lower face of the diaphragm is acted upon by the adjustable spring 26, the valve is balanced when the pressure within the valve chamber 17 is equal to the tension of the spring 26 and the valve is held closed by the weight of its parts. If the pressure within the valve chamber 17 drops below that for which the spring 26 is adjusted, the fluid pressure on the upper side of the diaphragm becomes less than the spring pressure on the lower side thereof and the preponderance of the spring pressure opens the valve permitting additional fluid to pass from the valve chamber 14 through the ports 15 and 16 to the chamber 17 to restore the normal pressure within the house system. If, however, weather conditions are such as to require a lower head of pressure within the house system to maintain a predetermined temperature within the apartment, it is desirable that the pressure control valve be automatically influenced so as not to act in the normal manner. Having in view such conditions and with the object of controlling said valve by the temperature within the house, I provide in combination with the pressure control valve as described a temperature control valve acting directly upon and influencing the action of the pressure control valve, as shown in Fig. 2.

The top of the valve casing 13 is tapped at 31 and has threaded therein a bushing 32. Upon this bushing 32 is mounted a diaphragm chamber 33 the diaphragm 34 of which has its upper face exposed to the space 35 within said casing while its lower face has attached thereto a plunger 36 guided within the yoke 37 and the bushing 32, the lower end of the plunger resting upon the upper face of the valve 18. Springs 38, 38 supported by the yoke 37 bear upon the lower face of the diaphragm 34 while the surface 35 above the diaphragm is in communication by means of the pipe 39 with a thermostatic motor valve 40 of any well known construction whereby in the usual manner a pressure fluid supplied by the pipe 41 is admitted to or exhausted from the space 35 according as the temperature in the apartment rises above and falls below a predetermined degree.

The action of the temperature control valve upon the pressure control valve is as follows: If the temperature rises above that for which the thermostat is set, pressure fluid will be admitted to the space 35 forcing the diaphragm 34 and its plunger 36 downward until its lower end bears upon the upper face of the valve 18 whereby the valves 18 and 19 will be held more nearly or quite closed even though the pressure within the valve chamber 17 and the pipe 12 may have fallen sufficiently below the pressure for which the spring 26 is set as would normally open said valve. Thus the pressure control valve is itself positively controlled by the temperature control valve so that its normal operation is intermitted and the temperature within the apartment is maintained constant under a reduced head of pressure within the house system.

The construction thus far described is the same as that set forth and claimed in my application for patent filed concurrently herewith and will of itself result, as previously stated, in maintaining within the valve chamber 17 at the entrance to the house piping a pressure which is independent of that in the valve chamber 14 on the supply side of the valve. In order, however, to render the flow within the house piping independent of fluctuations in the return main and to maintain within the house piping a predetermined head of excess pressure at the inlet over that of the outlet I have devised further constructional features which combine, with the pressure control and with or without the temperature control, a differential control whereby the system is rendered wholly automatic for the purpose stated.

The pressure within the house piping is, as will be readily understood, unaffected by pressure fluctuations in the supply main 42 by reason of the interposed pressure control valve 13. Variations of pressure however in the return main 43 are transmitted to the house piping by reason of the unobstructed communication between said return main 43 and the outlet pipe 44 from the house. Under old conditions fluctuations in the return main exert a disturbing effect on the head of pressure in the house piping so that it has been impossible to maintain therein a constant differential or head of pressure. By my invention I provide for the equalizing of any increase or decrease in pressure at the outlet from the house by simultaneously and to an equal extent increasing or decreasing the pressure at the inlet to the house piping through the pressure control valve.

By reference to Fig. 1 of the drawing it will be seen that I provide a cross connection 45 between the outlet pipe 44 and the space 46 below the diaphragm 25 of the pressure control valve, so that the lower side of the diaphragm in the valve opening direction is exposed to the pressure of the heating fluid at the outlet from the house piping. If, as before assumed, the pressure in the valve supply chamber 14 is 60 pounds and the pressure in the valve chamber 17 at the inlet of the house piping be desired to be maintained at say 12 pounds in order to secure a head of pressure or differential of 2 pounds over the pressure of 10 pounds at the outlet from the house system, the spring 16 will be adjusted to exert upon said diaphragm in the valve opening direction a force of 2 pounds, which, added to the back pressure of 10 pounds in the pipe 45, makes a total pressure of 12 pounds on the lower side of the diaphragm, which total pressure is balanced by the pressure of 12 pounds within the house inlet pipe 12 and the valve chamber 17 communicated to the space 22 above the diaphragm through the openings 30. In this balanced condition the weight of the valve and stem will maintain the valve closed. If, however, the difference between the pressure in the pipes 12 and 45, which measures the head of pressure within the house, drops below the desired 2 pounds differential by reason of the falling of the pressure in the pipe 12, the 10 pound pressure in the pipe 45 added to the two pounds pressure of the spring 26 will lift the diaphragm and open the valve admitting further fluid from the supply side of said valve which is in communication with the high pressure supply main, and as soon as the pressure in the pipe 12 is restored to 12 pounds the valve will close.

It will be understood that in practice the pressure control valve will remain slightly open so as to supply just enough fluid to the valve chamber 17 to maintain a constant flow through the inlet pipe 12 of the house piping the amount of the flow being governed by the differential between the inlet and outlet which is regulated by the tension of the spring 26, whereas if from any cause the differential falls below the required head the valve will open wider and if it rises above such predetermined head the valve will entirely close until the proper differential is restored. If for instance the pressure in the return main 43 at the outlet from the pipe 44 drops to 9 pounds the pressure in the pipe 45 will likewise drop to 9 pounds, which, added to the 2 pounds pressure of the spring 26, makes a total of 11 pounds, a force insufficient to balance the pressure of 12 pounds in the pipe 12 and consequently the valve will be held tightly closed by the pressure on its upper face until the pressure in the pipe 12 drops to 11 pounds when the valve will again be balanced and will maintain this differential of 2 pounds between the pressure of 11 pounds at the inlet and 9 pounds at the outlet. If on the other hand the pressure in the return main 43 rises to say 15 pounds, this increase of 5 pounds is instantly transmitted through the pipe 45 to the lower side of the diaphragm 25 and being added to the 2 pounds pressure of the spring 26 a total pressure of 17 pounds is exerted upon the under side of the diaphragm opening the valve against the pressure of 12 pounds on the upper side of the diaphragm and the valve is held open until the pressure upon the upper side of the diaphragm and in the valve chamber 17 and the pipe 12 is raised to 17 pounds when the valve will again become balanced and there will be maintained under such conditions the constant differential of 2 pounds over the inlet pressure 17 and the outlet pressure of 15.

While under ordinary conditions it may be found that a differential of 2 pounds is required to maintain a sufficient flow through the system to properly heat the house a less differential or a lower head of pressure may be amply sufficient in comparatively warm weather and under such circumstances the temperature control valve 33 will operate in opposition to the spring 26 to maintain the pressure control valve more nearly or quite in its closed position if the temperature in the room is too high even though the head of pressure within the house piping may have dropped below the 2 pounds for which it was set by the spring 26. The action of the pressure control valve will thus be modified or held inoperative until the temperature within the room lowers to such an extent that the plunger 36 of the temperature control valve 33 is withdrawn from the upper face of the valve 18 when the pressure control valve will resume its normal functions and the head of pressure within the house piping will be restored.

It will be understood that the form of valve shown, even if the temperature control feature is inactive or omitted, will be efficient for the purpose of maintaining within the house piping system a predetermined differential pressure at the inlet and outlet so that the head and resultant flow therein will be constant, the upper portion of such valve coming into operation only if the temperature in the building rises above that for which the device is set and operating at such time to maintain the differential head sufficiently low to accord with the reduced circulation required to maintain such predetermined temperature.

I claim:

1. A heating system comprising in combination a supply main, a return main, house piping connected therewith and including friction media, a pressure controlled valve interposed in the system between the supply main and the friction media and exposed in the valve closing direction to the fluid pressure at such point, adjustable means acting upon said valve in the valve opening direction, a cross connection between the valve and the system at a point between the friction media and the return main whereby to subject the valve in the opening direction to the influence of the fluid pressure at such latter point, and temperature actuated means arranged to act on said valve to modify the operation thereof, substantially as described.

2. A heating system comprising in combination a supply main, a return main, house piping connected therewith and including friction media, a diaphragm-operated pressure controlled valve interposed in the system between the supply main and the friction media, the diaphragm exposed in the valve closing direction to the fluid pressure at such point, a cross connection between the opposite side of the diaphragm and the system at a point between the friction media and the return main whereby to expose said diaphragm in a valve opening direction to the fluid pressure in the system at such latter point, and means arranged to bear upon said valve at a certain predetermined temperature to modify the operation thereof, substantially as described.

3. A heating system comprising in combination a supply main, a return main, a house piping connected therewith and including friction media, a diaphragm-operated pressure controlled valve interposed in the system between the supply main and the friction media, the diaphragm exposed in the valve closing direction to the fluid pressure in the system at such point, a cross connection between the opposite side of the diaphragm and the system at a point between the friction media and the return main whereby to expose said diaphragm in a valve opening direction to the pressure in the system at such latter point, adjustable yielding means acting on the valve in a valve opening direction, and thermostatically controlled means acting on said valve in opposition to the adjustable yielding means whereby to modify the operation of the valve, substantially as described.

4. A heating system comprising in combination a supply main, a return main, house piping connected therewith and including radiators, a diaphragm operated pressure controlled valve interposed in the house piping between the radiators and the supply main, a diaphragm exposed in the valve closing direction to the pressure in the house piping at the inlet from the supply main, a cross connection between the opposite side of the diaphragm and the house piping between the radiators and the return main whereby to expose the said diaphragm in a valve opening direction to the pressure in the house piping beyond the radiators, adjustable yielding means acting on the valve in a valve opening direction, a thermostatically actuated means arranged to act on said valve to modify the action of the adjustable yielding means, substantially as described.

JOHN C. HORNUNG.

Witnesses:
W. H. SCHOTT,
ARTHUR F. LINDLEY.